(12) United States Patent
Seminel et al.

(10) Patent No.: US 11,724,794 B2
(45) Date of Patent: Aug. 15, 2023

(54) COCKPIT INCEPTOR SYSTEM

(71) Applicant: Ratier-Figeac SAS, Figeac (FR)

(72) Inventors: Bruno Seminel, Figeac (FR); Arnaud Delpeuch, Beduer (FR); Cedric Antraygue, Figeac (FR)

(73) Assignee: RATIER-FIGEAC SAS, Figeac (FR)

(*) Notice: Subject to any disclaimer, the term of this patent is extended or adjusted under 35 U.S.C. 154(b) by 96 days.

(21) Appl. No.: 17/205,198

(22) Filed: Mar. 18, 2021

(65) Prior Publication Data
US 2021/0291963 A1    Sep. 23, 2021

(30) Foreign Application Priority Data
Mar. 20, 2020  (EP) .................................... 20315041

(51) Int. Cl.
*B64C 13/04*  (2006.01)
*G01L 5/00*  (2006.01)
*B64C 13/50*  (2006.01)

(52) U.S. Cl.
CPC ........ *B64C 13/0421* (2018.01); *B64C 13/503* (2013.01); *B64C 13/507* (2018.01); *G01L 5/0061* (2013.01)

(58) Field of Classification Search
CPC . B64C 13/0421; B64C 13/042; B64C 13/503; B64C 13/507; G01L 5/0061
See application file for complete search history.

(56) References Cited

U.S. PATENT DOCUMENTS

| | | |
|---|---|---|
| 3,002,220 A1 | 8/2001 | Wilkens |
| 8,380,364 B2 * | 2/2013 | Ciholas .................. B64C 13/38 244/236 |
| 8,401,716 B2 * | 3/2013 | Ciholas ..................... B64C 9/10 244/76 R |
| 8,485,051 B2 | 7/2013 | Knoop et al. |
| 8,991,771 B2 | 3/2015 | Antraygue |
| 9,340,278 B2 * | 5/2016 | Hagerott ............... B64C 13/345 |
| 9,381,998 B2 | 7/2016 | Taylor |

(Continued)

FOREIGN PATENT DOCUMENTS

| | | |
|---|---|---|
| DE | 29609458 U1 | 12/1996 |
| EP | 2052966 A2 | 4/2009 |

(Continued)

OTHER PUBLICATIONS

Extended European Search Report for International Application No. 20315041.2 dated Oct. 26, 2020, 8 pages.

*Primary Examiner* — Rodney A Bonnette
(74) *Attorney, Agent, or Firm* — Cantor Colburn LLP

(57) ABSTRACT

An aircraft inceptor system includes an inceptor member arranged to be operated by a user to cause a corresponding movement of a moveable aircraft surface. The system also includes means for detecting the operation of the inceptor member by the user and for providing a movement signal, associated with the detected operation, to a flight control computer, the flight control computer providing a control signal to an actuator to move the aircraft surface according to the movement signal. The means for detecting the operation of the inceptor member by the user comprises a force sensor configured to sense the force applied by the user to the inceptor member, the movement signal being derived based on the sensed force.

12 Claims, 4 Drawing Sheets

(56) References Cited

U.S. PATENT DOCUMENTS

| | | | |
|---|---|---|---|
| 9,469,393 B2 | 10/2016 | Antraygue | |
| 2009/0125166 A1* | 5/2009 | Johnson | B64C 13/507 |
| | | | 701/3 |
| 2009/0222168 A1* | 9/2009 | Egenfeldt | B62D 5/006 |
| | | | 701/41 |
| 2010/0145555 A1 | 6/2010 | Hagerott et al. | |
| 2011/0112705 A1* | 5/2011 | Antraygue | G05D 1/0077 |
| | | | 701/3 |
| 2013/0256463 A1* | 10/2013 | Antraygue | B64C 13/0421 |
| | | | 244/234 |
| 2015/0191241 A1* | 7/2015 | Antraygue | B64C 13/507 |
| | | | 701/3 |
| 2017/0212514 A1 | 7/2017 | Taylor et al. | |
| 2018/0300970 A1 | 10/2018 | Huynh et al. | |
| 2019/0176969 A1 | 6/2019 | Zierten et al. | |

FOREIGN PATENT DOCUMENTS

| | | | |
|---|---|---|---|
| EP | 2052966 A3 | 2/2010 | |
| EP | 2311729 A1 | 4/2011 | |
| EP | 3495261 A1 | 6/2019 | |

\* cited by examiner

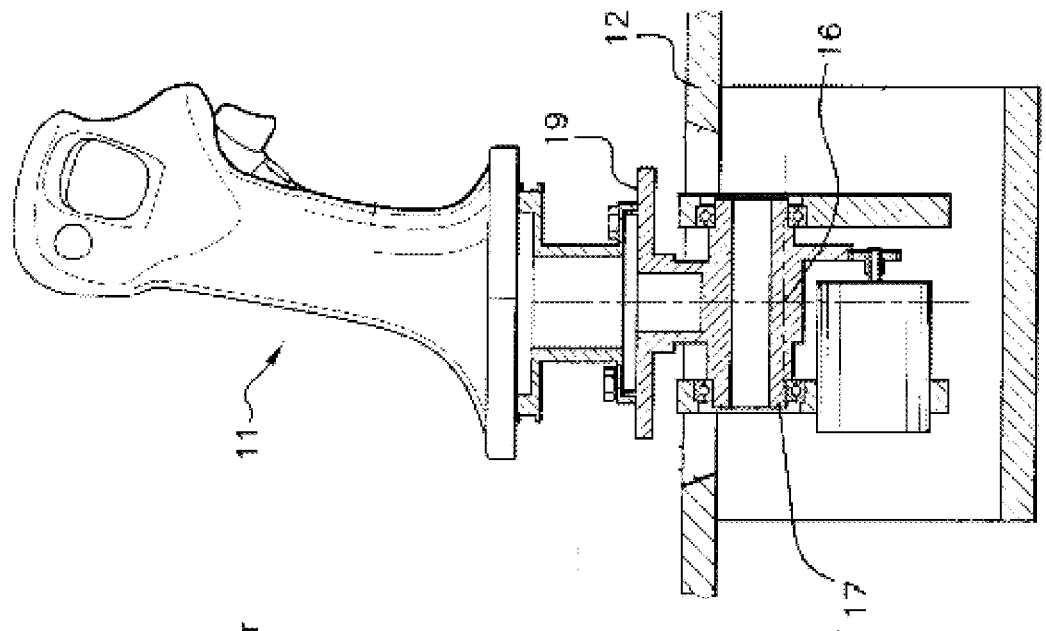
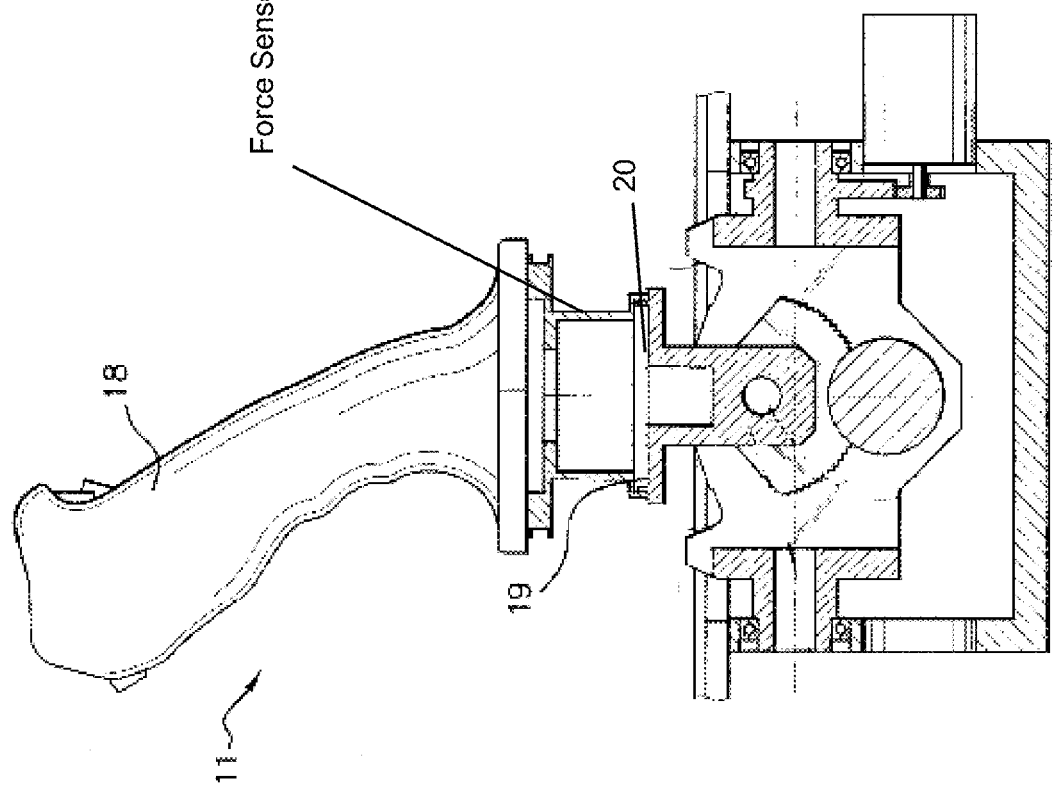

COCKPIT INCEPTOR SYSTEM

FOREIGN PRIORITY

This application claims priority to European Patent Application No. 20315041.2 filed Mar. 20, 2020, the entire contents of which is incorporated herein by reference.

TECHNICAL FIELD

The present disclosure relates to a cockpit inceptor system for allowing piloting control of aircraft surfaces.

BACKGROUND

Various types of cockpit inceptors are known to allow a pilot or crew to control, from the cockpit, the movement of flight control surfaces such as wing flaps, slats, elevators, rudders etc. to control flight. The inceptors are in the form of sticks, pedals, levers, handles, wheels and the like which are operated by the pilot or crew and which, responsive to the crew's operation, cause a desired movement of the associated flight control surface(s).

Traditional mechanically controlled systems comprise mechanical linkages or cables connecting the inceptor to the flight surface to transfer movement of the inceptor to a corresponding movement of the surface. Such systems are still used in some aircraft, especially smaller aeroplanes and helicopters.

More recently, flight inceptor systems have been developed in which the movement of the inceptor, by the user is detected by a sensor, or, more precisely, the position of the inceptor is detected by a position sensor. This provides a position signal to a flight control computer, FCC, which, in turn, sends electrical signals to actuators to move the flight control surfaces. The algorithm used by the FCC to obtain the control signal for the actuator can use a gain factor so as to vary the gain between the position signal and the control signal, which is an advantage over mechanical systems.

The movement of the inceptors required to move flight control surfaces is designed to feel as intuitive as possible so, e.g. a forward movement of a stick by a given amount may cause an elevator to lift by a certain amount, further forward movement causes the elevator to lift more, backward movement causes the elevator to lower.

The user should be able to 'feel' as if their movement of the inceptor is causing movement of the flight control surface even when the actual control is by electrical signal, and so inceptors are typically designed with springs and, optionally, dampers to provide the user with an appropriate force feedback to confirm to them that they are actually controlling movement. The springs and dampers may be configured such that, for example, when the force to move the member increases, the greater the degree of movement and/or rate of change of position, Force sensors may be incorporated in some systems, typically active inceptors, for providing force level signal/information to the FCC, Flight Data Recorders or any other systems.

The force sensor may have a sensor element that deforms in response to the action of the user. Force sensors make it possible, e.g., to carry out test flights and supply signals which are useful in the automatic actions associated with such inceptors. Such inceptors with force sensors are described in, e.g., US 2013/0256463.

As inceptors are made of mechanical parts guided with bearings or bushings. It cannot be considered completely impossible that an inceptor will stick or jam and application of force by the user will in such a case not lead to the desired movement of the inceptor that will provide a proper position signal to control the flight control surface. The user would then in the worst case lose control of the surfaces which can have catastrophic consequences. This is becoming even more of an issue with the trend towards reduced crew or single pilot operation where there is no back-up from a second pilot in the event of failure.

There is a need for a cockpit inceptor system that can mitigate the effect of such jams by accommodating failure and allow continued control of the aircraft.

SUMMARY

According to a first aspect of the present disclosure, there is provided an aircraft inceptor system comprising an inceptor member arranged to be operated by a user to cause a corresponding movement of a moveable aircraft surface, means for detecting the operation of the inceptor member by the user and for providing a movement signal, associated with the detected operation, to a control device, the control device providing a control signal to an actuator to move the aircraft surface according to the movement signal, wherein the means for detecting the operation of the inceptor member by the user comprises a force sensor configured to sense the force applied by the user to the inceptor member, the movement signal being derived based on the sensed force.

Preferably, the control device provides the control signal based on an algorithm that converts a force signal indicative of the sensed force on the inceptor by pilot to an inceptor position signal. The algorithm could be performed in the control device itself or, alternatively, in some external device or electronics, or, alternatively, in electronics in the inceptor.

Preferably, the algorithm converts the force signal to the position signal based on the static feel law.

Preferably, the algorithm includes a stop function defining a limit on the extent to which an increase in force causes a change in the position signal.

Preferably, the algorithm takes into account inceptor system inertia and/or inceptor system damping and/or inceptor system damping and/or inceptor system friction in converting the force signal to the position signal in order to get a position signal that represents accurately the actual inceptor position whatever the speed and acceleration of the command on the grip are.

According to a second aspect, there is provided a method of controlling movement of an aircraft flight control surface, comprising measuring a force applied by a user to a flight inceptor member and deriving a control signal from the measured force, and controlling movement of the flight control surface according to the control signal.

BRIEF DESCRIPTION OF THE DRAWINGS

Preferred embodiments will be described, by way of example only, with reference to the drawings.

FIGS. 2A and 2B show, respectively, front and side views of an inceptor with a force sensor.

DETAILED DESCRIPTION

According to the disclosure one or more flight inceptors such as sticks, pedals, handles, wheels etc. are provided in the cockpit of an aircraft in reach of the pilot. The inceptors are each associated with one or more flight control surfaces of the aircraft e.g. wing flaps, slats etc. that control the flight of the aircraft. Pilots are trained in moving the inceptors, with their hands and feet, in appropriate directions and by appropriate degrees to cause desired movement of the aircraft surfaces. A pilot will develop a feel for the force and displacement to be applied to an inceptor member to cause any given movement of the corresponding surface and the pilot will expect to feel resistance as they move the inceptor to have the feeling that they are controlling the movement.

Figure 1:
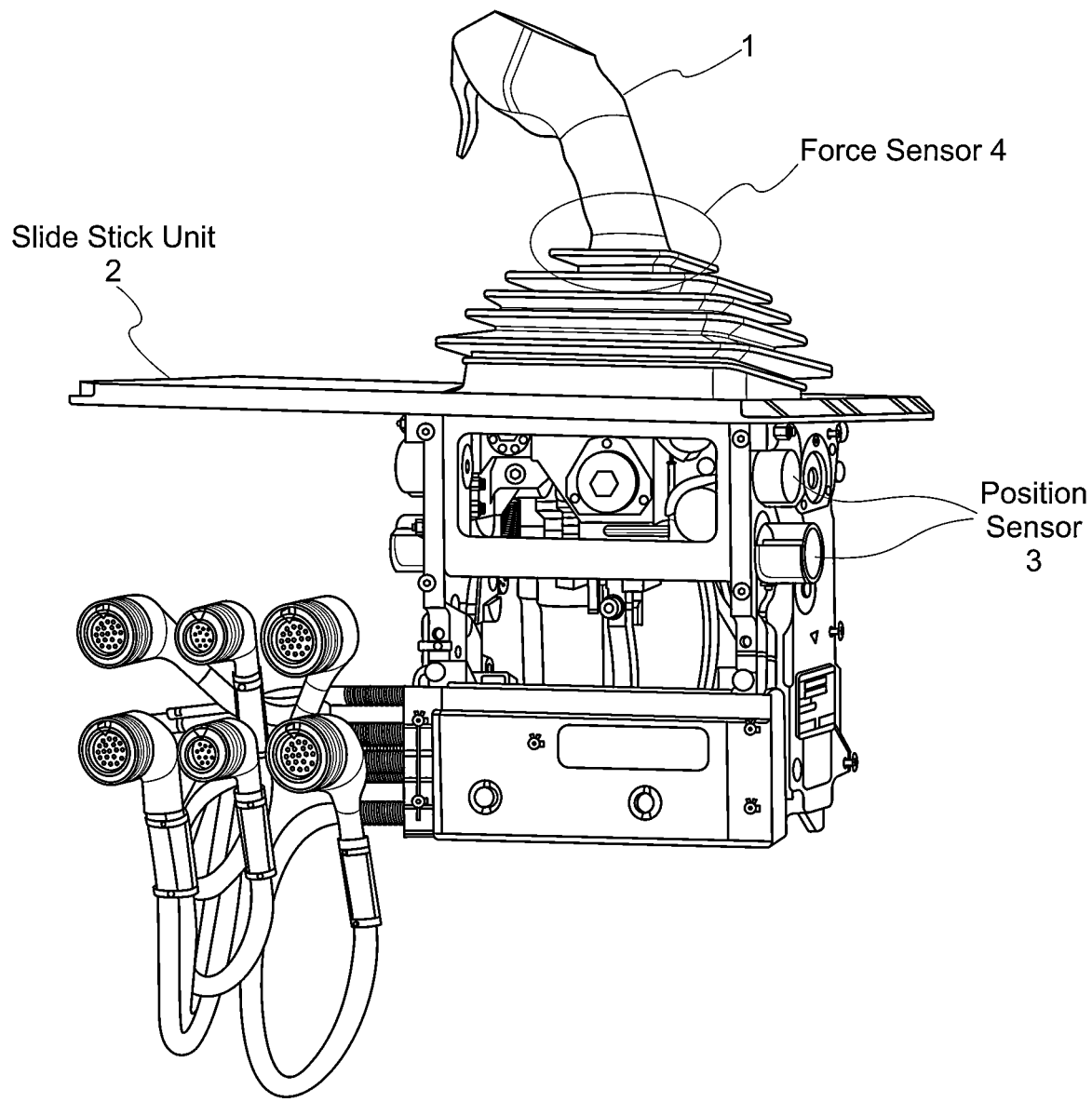
FIG. 1 is a schematic view of a known inceptor using position sensing.

In conventional systems, such as shown in FIG. 1, a position sensor 3 will detect the position of the inceptor, here a stick 1, in a side stick unit 2, when it is moved and will generate a corresponding position signal. The position signal is transmitted to the flight control computer, FCC (not shown), which performs an algorithm on the position signal or uses e.g. a look-up table to obtain a control signal for an actuator to cause movement of the corresponding aircraft surface in the desired direction and by the desired amount.

Springs and dampers (not shown in FIG. 1) create a force feel when the user moves the inceptor member 1 so that the user 'knows' that he is controlling the surface (i.e. the user receives a force feedback as if the control were a traditional mechanical system). A force sensor 4 may detect the force and provide a force signal/information.

For a given rate of deflection, the amount of force required to move the stick increases with the amount of deflection thanks to the spring(s). It also increases with the rate of deflection when a damper is used in the inceptor, typically, it varies linearly with the rate of deflection or with the square of rate of deflection ($R^2$). Because of the masses and inertias of the inceptor's moveable components, the force on the stick will also vary with the acceleration applied to the stick (rate of change of the rate of change of the deflection).

It can then be seen that a given force applied on the stick by the crew may correspond to an infinite number of stick positions around the static condition position.

In the system of the present disclosure, the control device, e.g. an external control computer such as the FCC or other aircraft electronics obtains the control signal based on a signal from one or more force sensors 19 instead of from one or more position sensors. The force sensor detects the force applied by the user on the inceptor member, here stick 11, and generates a corresponding force signal. This is used by the FCC (not shown) to obtain a corresponding control signal to move the aircraft surface (not shown). In one embodiment, the algorithm can be performed by electronics in the inceptor itself.

In steady state flight operation, e.g. for a stick, with the grip held static relative to its support 12—the force exerted by the user on the member will be proportional to its deflection and so the force signal will be the same (or with a K multiplying factor) as a position signal would be with a system using a position sensor. The pilot exerts a particular force on the member 11 in a given direction and this causes a corresponding change in position of the member. The force sensor 19 essentially generates a control signal in the same way as a position sensor would have done in this situation.

The force sensor 19 may be, e.g., in the form of strain gauges, comprising a membrane 20 that is flexurally deformed according to the amount of torque imparted on the stick 11 by the pilot. Other force sensors may also be used, e.g. a magnetostrictive sensor.

Figure 3:
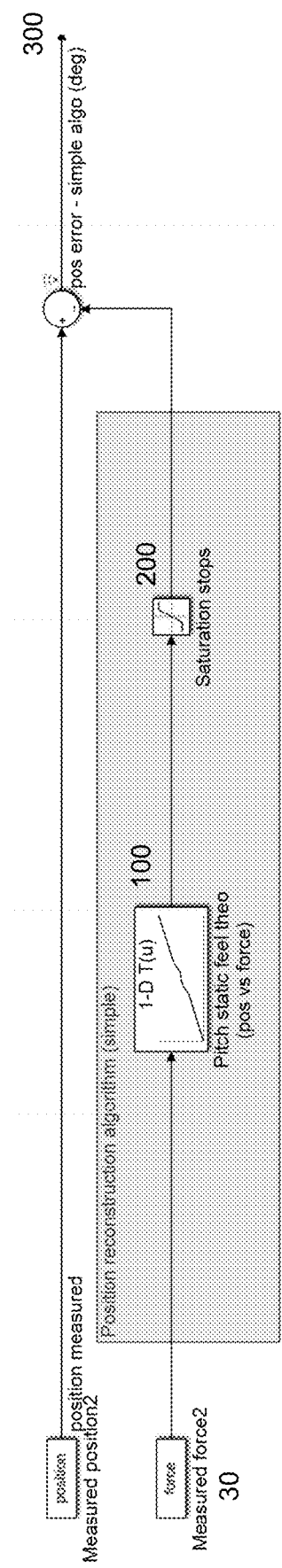
FIG. 3 is a block diagram of a simple algorithm for a system as described herein.

According to the disclosure, the algorithm is provided to convert the sensed force to a desired position, as represented simply in FIG. 3. The detected force signal from the force sensor 19 is provided as an input 30 to the algorithm. The algorithm applies the static feel law 100 to the input, whereby, generally, an increase in force will correspond to a proportional change in position in a given direction. A saturation function is applied to set stop positions beyond which the position will not change with increased applied force. The algorithm output is the signal indicative of the desired position or change in position of the surface.

However, in order to perfectly replicate the conventional stick operation and feel, the FCC will need to apply correction factors to the generation of the control signal based on the force signal due to the effect of the dampers/springs that provide feedback force. Also, the inceptor member itself will have an inherent mass inertia that provides additional forces and G-forces may create additional loads on the inceptor member. To take this factor into account and replicate the current position sensor control, correction factors should be applied to the load that the FCC uses to generate the control signal.

To compensate for such transient forces and loads, position or speed sensors may be provided in the inceptor member, as well as accelerometers. Inertial loads are a function of the inceptor acceleration and can be computed from the mass inertia and associated loads and the rate of change of rotational speed.

'Viscous' loads generated by the damper can also be calculated from the stick speed.

A corrected force input signal can be computed taking all these forces and loads into account e.g. using the vectorial sum of the force sensor signal, the inertial load and the viscous load to generate, in the FCC, a control signal that is a true and accurate representation of the inceptor desired position.

Figure 4:
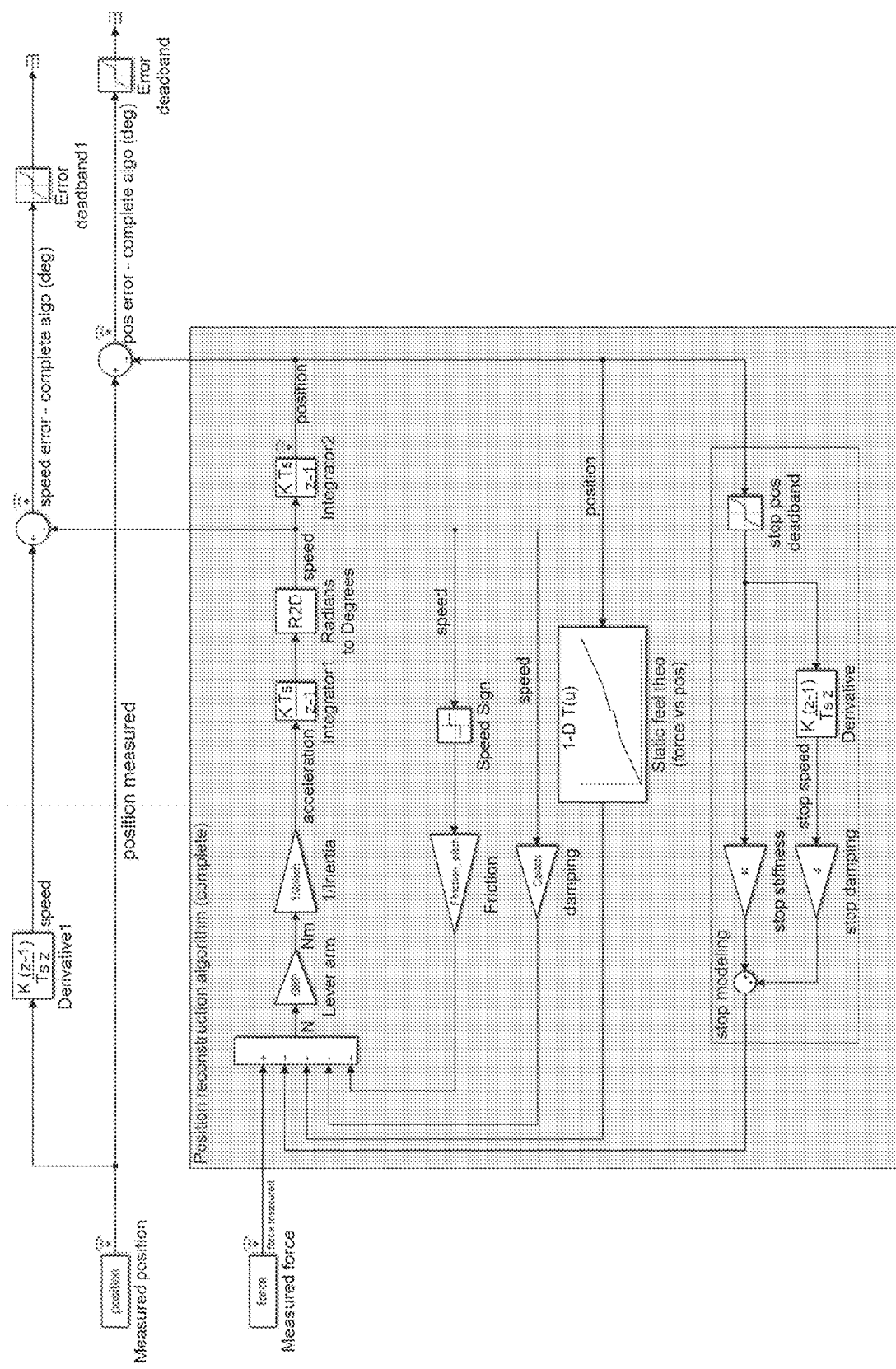
FIG. 4 is a block diagram of a more complex algorithm for a system as described herein.

To take into account these factors and provide a more accurate position control, in a preferred embodiment, a more complete algorithm such as shown in FIG. 4 may be used. This algorithm includes inertia, damping, friction, and stop characteristics. These characteristics are also set to a nominal or theoretical value in the algorithm.

The algorithm is shown in discrete time, i.e. sampled time, in order to be implemented in software; alternatively it could be done in continuous time using analogic hardware components.

The force output (measured by force sensor) is subtracted in algorithm with several forces.

These forces are friction force (force depending on direction of displacement, sign of grip velocity), damping force (force depending on grip velocity), static spring force (force depending on grip position), stop force (force characteristic when forcing onto hard stop of inceptor).

Any combination of these forces is possible.

Some of these forces may be optional, for instance, friction forces may not considered in some cases.

The output of the subtraction represents a force, this force is converted to torque considering the lever arm/lever radius of the inceptor (global torque).

Alternatively, the force sensor may be replaced by a torque sensor; in that case, all forces may be replaced by torques in the proposed algorithm. In that case, it is of course not necessary to consider the lever arm radius.

The global torque is then divided by the inertia of the inceptor to get the acceleration of inceptor.

This acceleration is then the input of a first integrator which outputs the speed of inceptor. This speed output is used to compute the friction and damping force. In our example figure, the friction depends on the sign of speed and the damping is proportional to speed. In other algorithm implementations, the damping can vary with the square of speed or with several slopes depending on the inceptor.

This speed is then the input of a second integrator which outputs the position of the inceptor. This position output is used to compute the static spring force. This static force characteristic may be stored in a look up table and represent the spring feel of inceptor.

The position is also used as an input of a stop deadband which deadzone is set with respect to the hard stop positions of inceptor. The output of the deadband is the deflection angle due to the stop stiffness, it is multiplied by stiffness to get the static stop force, and the derivative is also determined to get the stop structural damping (when multiplied by a damping factor). The stop static and damping forces are summed to get the stop force.

Thus, based on the mechanical characteristics of inceptor (inertia, friction, damping, spring, hard stop characteristic) the position of grip is computed using the measurement of the force (or torque).

This estimated position may also be subtracted to measured position to get the position error.

This position error may be used to detect any abnormal event such as fracture of springs, loss of damper, jam of inceptor. Algorithms using some, but not all of the characteristics shown in FIG. 4 may also be used.

The algorithm may be performed in the control device that controls movement of the surface. Alternatively, the algorithm may be performed in an external device or could be performed in circuitry in the inceptor.

In the case of a jam (failure mode), when the user applies a same force or even a greater one, there will be no, or less, deflection or position change of the member. If a conventional position sensor is used, this will not generate a position signal corresponding to the desired movement of the inceptor member and so will not generate a control signal to move the aircraft surface according to the intention of the user.

With the force sensor of the present disclosure, however, even in the case of a jam, the system will detect the force applied by the user even though the position does not change, or changes less than desired. The generated force signal is used to generate the control signal if the force sensor is located in the inceptor so that it still measures force in the event of any jam. The force signal will always be a valid input to generate the signal to control movement of the surface, for any jam condition of the inceptor.

The force sensor needs to be located between the grip/lever etc. of the inceptor, i.e. where the user applies force to the inceptor member, and any inceptor components that could give rise to a jam condition e.g. bearings, dampers, friction devices etc. The closer to the grip or lever it is located, the better. Ideally the force sensor is located in the grip of the grip/lever of the inceptor. The user's 'feel' will be impacted but he will still be able to safely control the aircraft.

The arrangement of this disclosure does not require reconfiguration of existing hardware. The FCC can be designed with a single logic or algorithm to control the flight control surfaces from force signals provided by the inceptor member and this logic will retain control even in the case of inceptor jam. Alternatively, the algorithm/logic can also be built into an electronic unit specific to the inceptor or any electronic unit communicating with one or the other of the two above.

The described embodiments are by way of example only. The scope of this disclosure is limited only by the claims.

The invention claimed is:

1. An aircraft inceptor system comprising:
an inceptor member arranged to be operated by a user to cause a corresponding movement of a moveable aircraft surface, the inceptor member comprising a force sensor and at least one of a position sensor to measure a position of the inceptor member, a speed sensor to measure a speed of movement of the inceptor member and an accelerometer to measure acceleration of the inceptor member; and
means for detecting the operation of the inceptor member by the user and for providing a movement signal, associated with the detected operation, to a control device, the control device providing a control signal to an actuator to move the aircraft surface according to the movement signal;
wherein the means for detecting the operation of the inceptor member by the user comprises the force sensor and the force sensor is configured to sense the force applied by the user to the inceptor member, the movement signal being derived based on the sensed force;
wherein the control device provides the control signal based on an algorithm that converts a force signal indicative of the sensed force to a position signal; and
wherein the algorithm takes into account system inertial load, calculated from the output of the at least one of a position sensor to measure a position of the inceptor, the speed sensor to measure a speed of movement of the inceptor and the accelerometer to measure acceleration of the inceptor, in converting the force signal to the position signal;
wherein the algorithm takes into account system damping, calculated from the output of the at least one of the position sensor, the speed sensor and the accelerometer, in converting the force signal to the position signal;
wherein the algorithm uses a vectorial sum of the sensed force and the inertial load and the damping load in converting the force signal to the position signal.

2. The system of claim 1, wherein the algorithm converts the force signal to the position signal based on the static feel.

3. The system of claim 1, wherein the algorithm includes a stop function defining a limit on the extent to which an increase in force causes a change in the position signal.

4. The system of claim 1, wherein the control device is a device external to the inceptor member.

5. The system of claim 1, further comprising means whereby the position signal is compared to a measured position signal indicative of the actual position to provide a position error.

6. The system of claim 1, wherein the algorithm is performed: within the control device, in a device external to the control device; or by circuitry in the inceptor member.

7. The system of claim 1, wherein the force sensor is located on or in the inceptor member closer to the part of the inceptor member to which the user directly applies force than any components of the inceptor member that could generate a jam condition.

8. The system of claim 1, wherein the force sensor comprises a strain gauge, or wherein the sensor comprises a magnetostrictive sensor.

9. A method of controlling movement of an aircraft flight control surface, the method comprising:
measuring a force applied by a user to a flight inceptor member with a force sensor in the flight intercept member;
measuring a position of interceptor with a position sensor in the flight intercept member;

measuring a speed of movement of the flight inceptor member with a speed sensor in the flight inceptor member;

measuring with an accelerometer in the flight inceptor member an acceleration of the flight inceptor member;

detecting the operation of the inceptor member by the user;

providing a movement signal, associated with the detected operation, to a control device;

wherein the algorithm takes into account system inertial load calculated from the output of the at least one of a position sensor to measure a position of the inceptor, the speed sensor to measure a speed of movement of the inceptor and the accelerometer to measure acceleration of the inceptor, in converting the force signal to the position signal;

wherein the algorithm takes into account system damping, calculated from the output of the at least one of the position sensor, the speed sensor and the accelerometer, in converting the force signal to the position signal;

wherein the algorithm uses a vectorial sum of the sensed force and the inertial load and the damping load in converting the force signal to the position signal; and controlling movement of the flight control surface according to the control signal.

10. The method of claim 9, wherein the algorithm converts the force signal to the position signal based on the static feel; or wherein the algorithm includes a stop function defining a limit to the extent to which an increase in force causes a change in the position signal.

11. The method of claim 9, wherein the position signal is compared to a measured position signal indicative of the actual position to provide a position error.

12. The method of claim 9, wherein the force signal is indicative of the sensed force, the force signal being corrected using the algorithm, the corrected force signal used by a control device to cause movement of the flight control surface, the control device having an architecture allowing continued control of the flight control surface in the event of a jam of the inceptor member without any reconfiguration of logic used by the control device and without the need to use an alternative input signal.

* * * * *